(12) United States Patent
Feser

(10) Patent No.: US 9,140,375 B2
(45) Date of Patent: Sep. 22, 2015

(54) VALVE AND ASSEMBLY METHOD

(75) Inventor: Hubert Feser, Gemuenden (DE)

(73) Assignee: Robert Bosch GmbH, Stuttgart (DE)

( * ) Notice: Subject to any disclaimer, the term of this patent is extended or adjusted under 35 U.S.C. 154(b) by 1070 days.

(21) Appl. No.: 13/130,037

(22) PCT Filed: Oct. 24, 2009

(86) PCT No.: PCT/EP2009/007618
§ 371 (c)(1),
(2), (4) Date: Aug. 8, 2011

(87) PCT Pub. No.: WO2010/057560
PCT Pub. Date: May 27, 2010

(65) Prior Publication Data
US 2011/0278488 A1    Nov. 17, 2011

(30) Foreign Application Priority Data
Nov. 19, 2008  (DE) .......................... 10 2008 058 263

(51) Int. Cl.
*F16K 27/02* (2006.01)
*F16K 31/122* (2006.01)

(52) U.S. Cl.
CPC ............. *F16K 27/02* (2013.01); *F16K 31/1221* (2013.01); *Y10T 137/5109* (2015.04); *Y10T 137/5196* (2015.04)

(58) Field of Classification Search
USPC ................ 137/454.2, 454.6, 270, 270.5, 596, 137/596.17, 884, 267; 251/30.01, 31
See application file for complete search history.

(56) References Cited

U.S. PATENT DOCUMENTS

| | | | | |
|---|---|---|---|---|
| 2,975,800 A * | 3/1961 | Doelger et al. | ........... | 137/565.14 |
| 3,814,375 A * | 6/1974 | Grotloh | ............................. | 251/28 |
| 4,613,111 A * | 9/1986 | Paquet et al. | .................... | 251/46 |
| 5,868,160 A * | 2/1999 | Cords et al. | ................. | 137/454.6 |
| 5,873,561 A * | 2/1999 | Bourkel et al. | .................. | 251/36 |
| 2006/0197041 A1* | 9/2006 | Szymaszek | ................ | 251/30.02 |

FOREIGN PATENT DOCUMENTS

| | | |
|---|---|---|
| DE | 4240838 | 6/1994 |
| EP | 0798471 | 10/1997 |
| JP | 2003343753 | 12/2003 |

OTHER PUBLICATIONS

International Search Report corresponding to PCT Application No. PCT/EP2009/007618, mailed Feb. 4, 2010 (German and English language document) (4 pages).

* cited by examiner

*Primary Examiner* — Kevin Murphy
*Assistant Examiner* — Jonathan Waddy
(74) *Attorney, Agent, or Firm* — Maginot, Moore & Beck LLP

(57) ABSTRACT

A valve for installation in a valve bore of a housing or valve block includes a valve bushing for insertion into the valve bore, a guided valve piston that can be moved axially in the valve bushing, an activation section of said piston projecting above the valve bushing axially, and a valve cover that is configured to be arranged over the valve bore and that forms, together with the activation section of the valve piston, at least one activation pressure chamber.

21 Claims, 4 Drawing Sheets

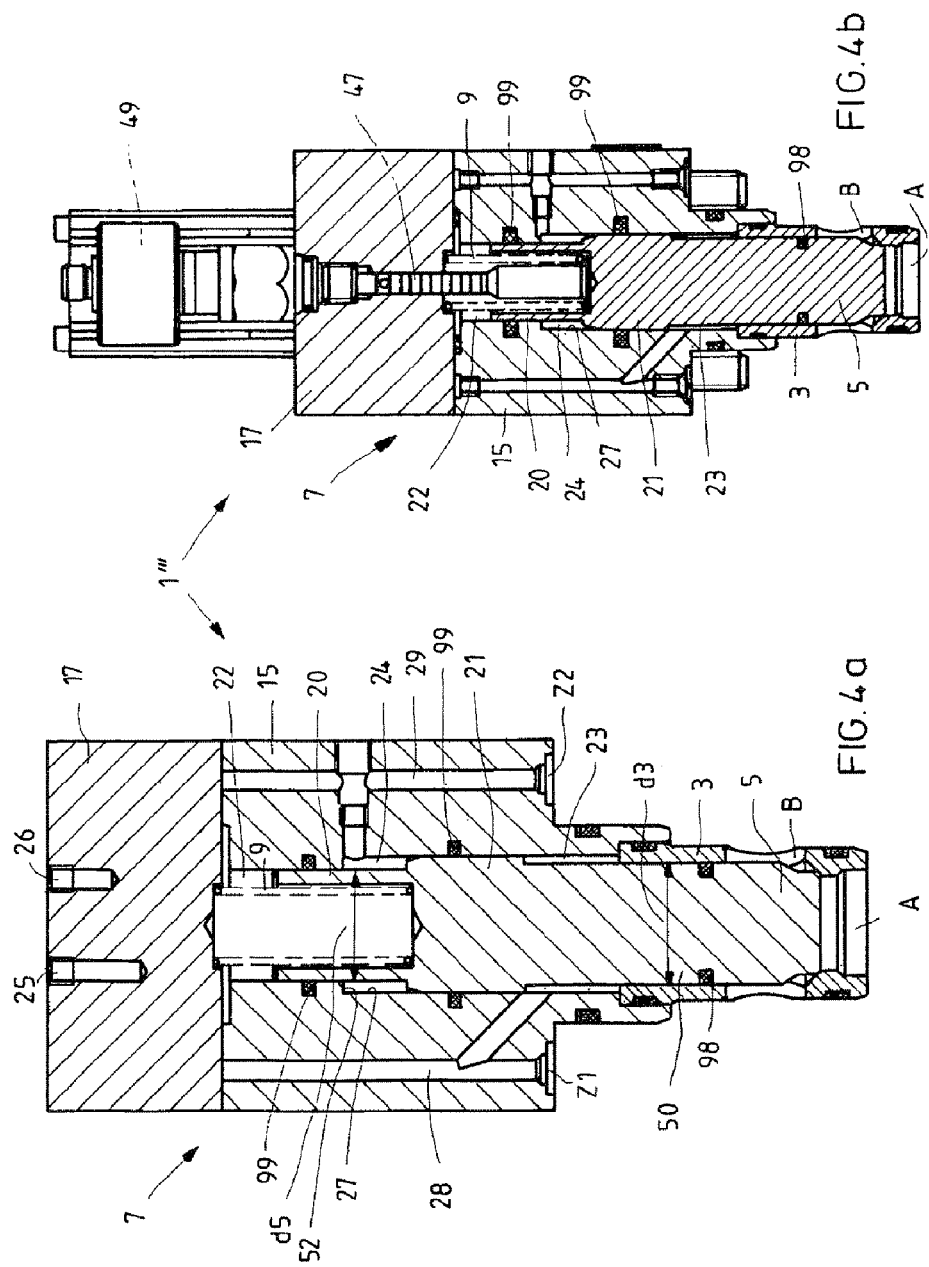

VALVE AND ASSEMBLY METHOD

This application is a 35 U.S.C. §371 National Stage Application of PCT/EP2009/007618, filed Oct. 24, 2009, which claims the benefit of priority to Serial No. DE 10 2008 058 263.8, filed Nov. 19, 2008 in Germany, the disclosures of which are incorporated herein by reference in their entirety.

BACKGROUND

The disclosure relates to a valve for installing in a valve bore. The disclosure relates furthermore to an assembly method for a valve of this type.

Under the designation 2/2 directional cartridge valves, Bosch Rexroth AG supplies seat valves or seat slide valves, as per data sheets RD 21010 and RD 21050, which are constructed from a valve bushing for inserting into an installation bore according to DIN ISO 7368 and from a control cover closing off the installation bore. The spring space of a valve piston inserted into the valve bushing is activated by means of control channels present in the control cover and optionally by a pilot control valve arrangements. Advantages of said valve systems, which are also referred to as logic valves or single-stage logic valves, include the high degree of variability, the robust structure and the cost-effective production even given a high nominal volumetric flow. The development of said concept has led to the construction of "active logic valves"—also two-stage and three-stage logic valves of an extended valve piston which projects into the control cover and on which an actuating piston is formed, said actuating piston making available further surfaces for the hydraulic displacement of the valve piston. Said further surfaces can be used, for example, for a rapid opening operation or closing operation which can be executed independently of the pressures in the valve bore.

Conventional active logic valves frequently have a valve bushing which is extended into the control cover and which receives the full extent of the valve piston, as shown in EP 0 798 471 B1. This reduces the available control cross sections and therefore the maximum nominal volumetric flow of the valve due to the wall thicknesses required at the valve bushing given a predetermined installation bore (also valve bore below).

It is true that other active logic valves guide the actuating piston of the valve piston in the control cover, for example the valves "active cartridge valves—monitored, series C13DCC and C18DCC" of Parker Hannifin Corporation, Ohio, USA, depicted in the catalogue HY14-3201/US. However, the control cover is difficult to manufacture due to the multiplicity of channels. The spring which is to be mounted in the control cover prevents the cover and valve bushing from being provided as a preassembled constructional unit. Lower piece numbers in comparison to the single-stage logic valves are required, this rendering the production of the control cover, valve bushing and valve piston components, which each differ in comparison to the single-stage logic valves, disproportionately expensive. Provision of functional variants is associated with a high outlay, since the individual components would have to be changed per se for this purpose.

SUMMARY

The disclosure is based on the object of making available an improved valve of the type mentioned at the beginning which can be produced in particular cost-effectively.

The object is achieved by a valve with the features set forth herein.

Owing to the fact that the valve cover which is to be arranged over a valve bore is divided axially into two components—an intermediate cover and a functional cover with a control channel, a two-stage or three-stage logic valve which is constructed in a simple manner and can be manufactured cost-effectively is provided. In addition, a high number of variants can be made available with little outlay. The intermediate cover forms not only the receiving space for the actuating section but moreover forms a predeterminable, for example standardized, intersection between the housing, into which the valve bushing is inserted, and a functional cover, by means of which hydraulic functions and circuit diagrams of the valve are stipulated from a multiplicity of variants. For example, existing control covers known from the conventional single-stage logic valve series can be used without modification as functional covers, since the intermediate cover makes available the intersection required for this purpose. Furthermore, simply constructed valve bushings which are known from the single-stage logic valve series can be used, since the actuating section of the valve piston is guided in the intermediate cover.

To provide a multiplicity of valve variants, it suffices, depending on the nominal size and in order to differentiate between two-stage and three-stage circuit diagrams, to provide in each case only a few intermediate covers, optionally even only one intermediate cover. With regard to the valve bushing, only the variants seat valve or seat slide valve have to be differentiated. With regard to the functional cover, the data sheets RD 21010 and RD 21050 from Bosch Rexroth AG describe a multiplicity of pilot control variants, which can be implemented efficiently with few control covers and pilot control valves and are intended for single-stage logic valves, said pilot control variants now also being able to be used for two-stage and three-stage logic valves. In addition, the two-part embodiment of the valve cover permits a valve spring to be mounted only upon assembly, and therefore a transport and captive securing means required for transporting a pretensioned spring is not needed.

The object is likewise achieved by an assembly method for providing a valve of this type.

The provision of a preassembled constructional unit facilitates and shortens the assembly and reduces the error rate upon final assembly. The valve bushing, the intermediate cover and the valve piston are identical in a multiplicity of valve variants and can therefore be combined at the manufacturer in order thereby to improve the quality of the logistics and to reduce the logistical outlay.

Advantageous refinements of the present disclosure are specified herein.

If the preassembled constructional unit comprises sealing means, the latter can advantageously be used for holding together the individual components in a manner adequate for transport.

According to a preferred refinement, a bottom surface of the main bore of the intermediate cover is formed on the functional cover—in particular on an end surface of the functional cover. Such an axial dividing of the valve cover facilitates the sealing at the separating point. In addition, the manufacturing is simpler, since the intermediate cover has bores which are parallel primarily with the axis of movement of the valve piston. In particular, such a division of the valve cover facilitates the insertion of a spring.

The actuating section preferably divides the main bore into an actuating pressure space on the functional cover side and into an actuating pressure space on the valve bushing side, and a control channel for the actuating pressure space on the valve bushing side is provided in the intermediate cover. This facilitates the activation of the two- or three-stage logic valve by means of the conventional connection diagram on the valve housing.

According to a particularly preferred refinement, the functional cover has means for producing a hydraulic function, which means can in particular comprise: a pilot control valve or an installation bore for a valve of this type, a throttle, a connecting surface for a pilot control valve, a lift stop, a displacement sensor and a switching position monitoring means. Said variants which are known per se for single-stage logic valves can now be used for the first time on a two- or three-stage logic valve—i.e. an active logic valve—with little outlay.

However, the intermediate cover may also have means for producing a hydraulic function, in order to increase the multiplicity of variants or in order to obtain functions which hitherto could only be produced with difficulty, if at all. Said means can in particular comprise: an actuation lock, a lift stop, a displacement sensor, a switching position monitoring means, a throttle and a pilot control valve.

The valve piston is preferably formed integrally with the actuating section. Tension forces and shearing forces can preferably be transmitted to the valve piston by the actuating section in a manner free from play, for which purpose the actuating section may, for example, also be formed on an actuating piston which is fastened to the valve piston in a manner free from play axially.

If on that end side of the intermediate cover which faces the functional cover there is a standardized connection diagram, in particular according to DIN ISO 7368, at least with regard to control connections, a multiplicity of existing control covers can be used with or without a slight modification.

If sealing means are provided between the valve bushing and the valve piston, the tightness of the valve can be improved. In addition, radial play is possible, and therefore less exacting manufacturing tolerances are necessary. The same applies if sealing means are provided between the actuating section and the main bore of the intermediate cover. For example, a clearance fit, in particular a clearance fit H7/e5, H7/f6, or H7/g5 or H8/e5, H8/f6, or H8/g5 according to DIN 7157 can therefore be accepted between the valve bushing and the valve piston or between the actuating section and the main bore. Fine machining of the valve piston can therefore be omitted.

Control connections and/or fastening means are preferably arranged with respect to the main bore of the intermediate cover in such a manner that an alignment of the intermediate cover can be changed in predetermined angular steps about the valve bore. As a result, a control channel for the actuating pressure space on the functional cover side or for the actuating pressure space on the valve bushing side can be connected to different control connections of the housing or valve block, and therefore, for example, the circuit diagram of the valve can be changed. For this purpose, a fixing pin for defining an angular alignment of the intermediate cover is preferably fastened releasably to an end side of the intermediate cover, which end side faces away from the functional cover.

If the main bore has a smaller cross section at a mouth on the functional cover side than at a mouth on the side remote from the functional cover, a high pressure loading, for example 500 bar instead of the customary 420 bar or 350 bar, can be accepted owing to the smaller pressurized surface at the separating point.

The present disclosure and the advantages thereof are explained in more detail below with reference to the exemplary embodiment which is illustrated in the figures.

BRIEF DESCRIPTION OF THE DRAWINGS

FIG. 4a shows, as a variant of the valve shown in FIG. 1, a three-stage valve construction, with a main control section and a two-stage actuating section which has an additional actuating surface, and FIG. 4b illustrates a variant of the valve which is shown in FIG. 4a and in which a position-measuring device is integrated in the valve cover.

DETAILED DESCRIPTION

Figure 1:
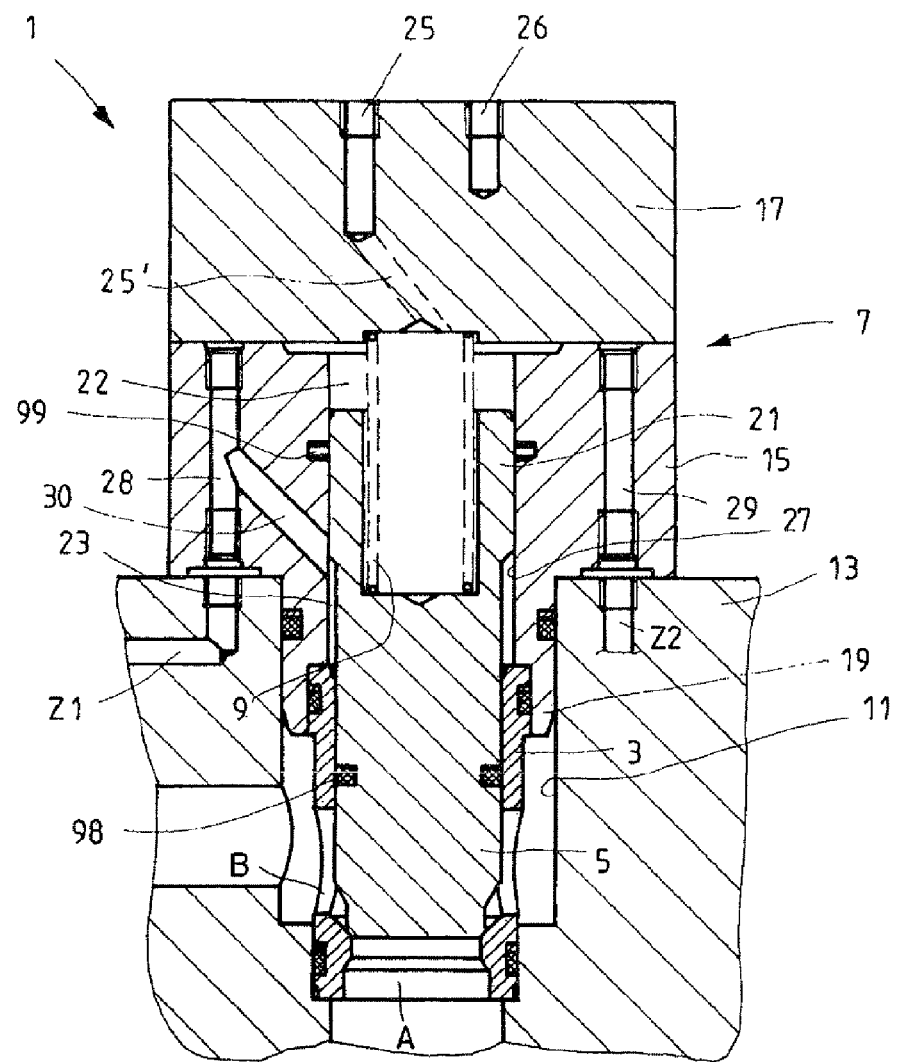
FIG. 1 shows a sectional illustration of a 2/2-port directional control valve according to the disclosure which has a two-stage construction—a main control section and an actuating section.

FIG. 1 illustrates a valve 1 for hydraulic applications, in more precise terms a 2/2-port directional control valve, also referred to as an active logic valve, which is displaceable by means of an actuating piston. The valve 1 has a valve bushing 3, a valve piston 5 which is inserted into the valve bushing 3, a valve cover 7 and a spring 9 arranged between the valve piston 5 and the valve cover 7. The valve bushing 3 is inserted together with the valve piston 5 located therein into the valve bore 11 of a control block 13. There are channels therein for the consumer connections A, B and the control connections X, Y (not illustrated), Z1, Z2 for the valve 1. The valve cover 7 is screwed onto the control block 13 over the valve bore 11. The valve bore 11 and the arrangement of the control connections X, Y, Z1, Z2 correspond to DIN ISO 7368.

The valve is roughly divided into a main stage and into an actuating stage. The main stage is formed by the valve piston 5 which is inserted into the valve bushing and which, in interaction with a seat surface provided in the valve bushing 3, controls the opening cross section between the consumer connections A and B. The actuating stage is formed by the valve cover 7 and the valve piston 5 with a radially projecting actuating section 21 which is received by the valve cover 7, with the actuating pressure spaces 22 and 23 being formed. The actuating pressure spaces 22 and 23 are activated via the control connections X, Y (not illustrated), Z1, Z2. Pilot control valves are optionally connected in between. Connecting channels 25 and 26 for pilot control valves are indicated on the valve cover 7.

The valve cover 7 is subdivided axially into an intermediate cover 15, which is fastened directly on the control block 13, and a functional cover 17 placed onto the intermediate cover 15.

A main bore 27 for receiving the valve piston 5 or the actuating section 21 thereof is provided in the intermediate cover 15. Said main bore continues in the direction of the control block 13 into an annular collar 19 protruding axially into the valve bore 11. In the annular collar 19, the main bore 27 is widened at a step in order to receive the valve bushing 3. Furthermore, secondary bores 28, 29 are present in the intermediate cover 15 axially symmetrically about the main bore 27. Said secondary bores serve as control channels. A bore 30 branches off transversely or diagonally from the secondary bore 28 in order to connect the latter to the actuating pressure space 23. As an alternative, the bore 30 may also be designed so as to branch off at right angles. In addition, a transverse bore can also be made from the bore 29 towards the actuating pressure space 23 and opening into the latter (not illustrated). One of said transverse bores—including the bore 30—can be closed by a stopper if the corresponding fluidic connection is not required. Furthermore, the main bore 27 and the secondary bores 28 and 29 are designed and arranged in such a manner that the same connection diagram as also present on the upper side of the control block 13 is produced on that end side of the intermediate cover 15 which faces the functional cover 17. However, certain deviations are advantageous. Said deviations will be described further on.

The functional cover 17, by means of the end side thereof facing the intermediate cover 15, closes off the main bore 27 and forms a contact surface for the spring 9. A control channel 25' leads through the functional cover 17 into the actuating pressure space 22. This can take place with the interconnection of a pilot control valve, for which the connections 25 and 26 are provided on that end side of the functional cover 17 which faces away from the intermediate cover 15. Control connections which are not required are blocked off at the separating surface between the intermediate cover 15 and functional cover 17 by the absence of a corresponding bore in the functional cover 17.

During the manufacturing, the intermediate cover 15, the valve piston 5, the bushing 3 and optionally the spring 9 are combined in the form of a preassembled constructional unit. Sealing rings 98 and 99 between the intermediate cover 15 and the valve piston 5 and between the valve piston 5 and the valve bushing 3 ensure that the components are held together in a manner adequate for transport. The spring 9 is not pretensioned and is therefore simple to transport. In addition, the use of the described sealing rings 98 and 99 permits the increase in the fit clearances between the components, in particular between the valve piston 5 and the valve bushing 3. This simplifies the manufacturing, since fine machining of the valve piston is not required. The functional cover 17 is configured according to the desired hydraulic circuit diagram and is made available separately. The multiplicity of control covers listed in data sheets RD21010 and RD21050, which are mentioned at the beginning, is available.

The valve 1 is installed or attached into the control block 13 as follows. First of all, the preassembled constructional unit consisting of the intermediate cover 15, valve piston 5 and valve bushing 3 is inserted into the valve bore 11 and aligned with the control block 13 and fastened. The spring 9 is inserted into the valve piston 5. The functional cover 17 is then mounted on the intermediate cover 15. In this case, the intermediate cover 15 and the functional cover 17 may be fastened separately on the particular base. However, the functional cover 17 and the intermediate cover 15 may also be fastened to the control block 13 together by screws which rest with the head thereof on the functional cover 17 and are guided through the intermediate cover 15.

The intermediate cover 15 has, on an end surface facing the control block 13, a pin which is received into a bore of the control block 13 (see letter G in DIN ISO 7368, which is to be included by reference to the disclosure) in order thereby to define the angular alignment of the intermediate cover 15. The pin is fastened removably to the intermediate cover such that the intermediate cover can be fitted in a different angular alignment. Use is expediently made of angular alignments which differ in steps of 90°, 180° or 270° from the originally defined angular alignment. For example, the channel to the actuating pressure space 23 may also be assigned via the bores 28 and 30 to another control connection, for example Z2, X or Y. This increases the diversity of variants of circuit diagrams which can be realized. Further pin receptacles are optionally formed on the intermediate cover 15, said receptacles defining the installation of the intermediate cover 15 in the alternative angular alignments described.

Figure 2:
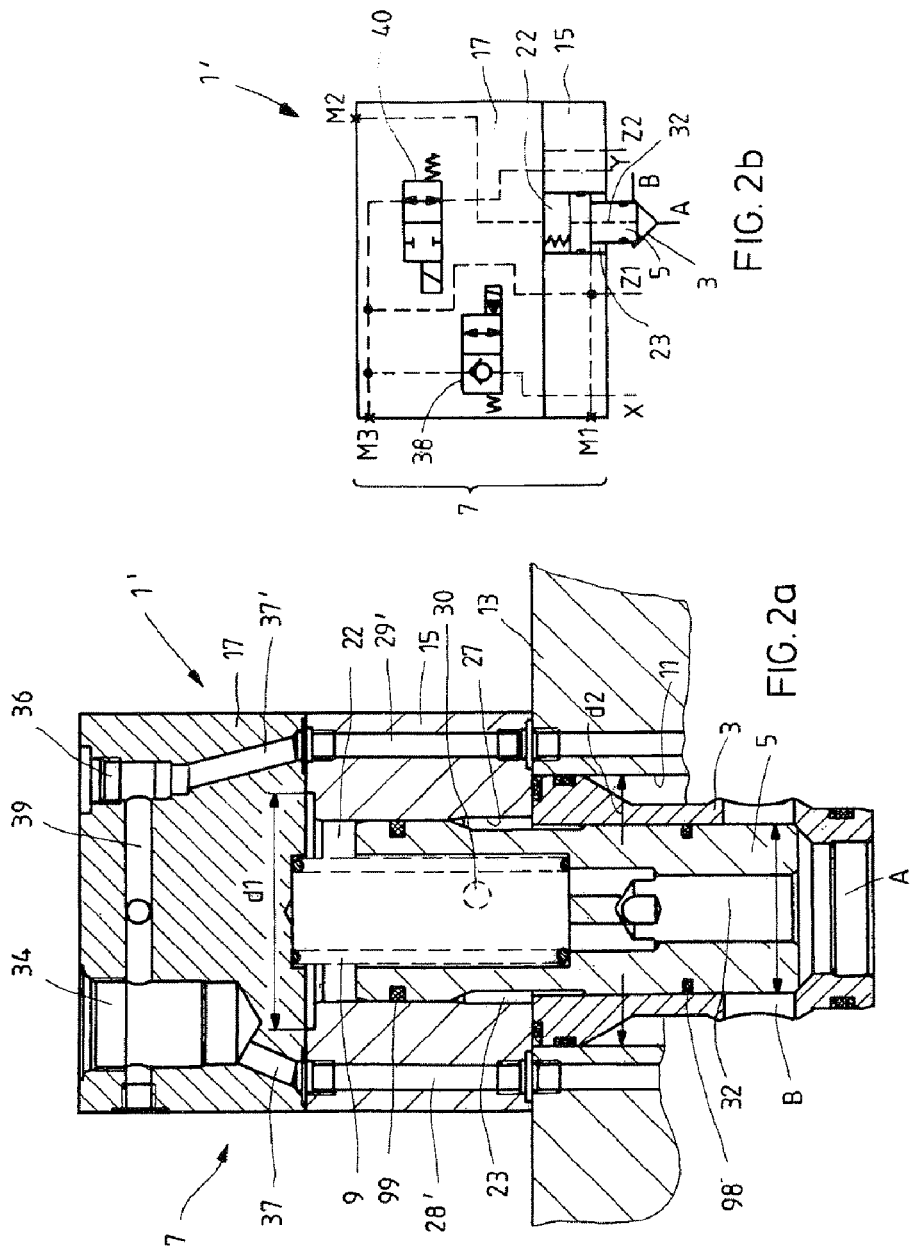
FIG. 2a illustrates a variant of the valve which is shown in FIG. 1 and is configured as a check valve.
FIG. 2b shows the hydraulic circuit diagram of a valve according to FIG. 2a which is provided with a pilot control valve configuration.

FIGS. 2a and 2b show a variant 1' of the valve 1 illustrated in FIG. 1. FIG. 2a shows a sectional drawing of the valve 1' while FIG. 2b shows the hydraulic circuit diagram.

The valve 1' substantially corresponds to the valve 1. The differences or modifications are explained below. While the valve piston 5 of the valve 1 has surfaces which can be acted upon directly in the opening direction from the connections A and B, the valve piston 5 of the valve 1' has only one surface which can be acted upon directly by the pressure medium in the connection A. A surface which can be acted upon directly from the connection B is not provided in this variant. Furthermore, there is a channel 32 in the valve piston 5, the channel connecting the actuating pressure space 22 between the valve piston 5 and the functional cover 17 to the connection A. The length of the valve bushing 3 corresponds to the depth of the installation bore. Said valve bushing, in the inserted state, ends flush at the mouth of the valve bore 11 with the surface of the control block 13. That end surface of the valve bushing 3 which faces the intermediate cover 15 bears against the facing, planar end surface of the intermediate cover 15.

The intermediate cover 15 has a main bore 27 which even at the widest point thereof has a smaller diameter d1 than the diameter d2 at the mouth of the valve bore 11. As a result, the hydrostatic forces with which the functional cover 17 is loaded drop, and higher operating pressures can be permitted. The illustration in FIG. 2a is rotated through 90° in comparison to FIG. 1 such that the control connections X and Y and the corresponding secondary bores 28' and 29' are now visible in the intermediate cover 15.

The control cover 17 has two installation bores 34 and for receiving pilot control valves. Said installation bores are connected via bores 37 and 37' running in the control cover to the secondary bores 28' and 29' of the intermediate cover 15 and to the control connections X and Y, respectively. A further bore 39 connects the installation bores 34 and 36 to the actuating pressure space 23 via the bores 28 (not illustrated) and 30.

The circuit diagram in FIG. 2b shows the valve 1' with an example of a pilot control valve configuration. The intermediate cover 15 and the functional cover 17 and also the valve piston and the valve bushing 3 are illustrated schematically. A 2/2-port directional seat valve 38, which, for its part, is subject to pilot control, and a 2/2-port directional switching valve 40 are inserted as pilot control valves into the installation bores 34 and 36, respectively. The two pilot control valves 38 and 40 are electrically actuable. The actuating pressure space 22 is connected to the connection A via the channel 32. The actuating pressure space 23 is connected via the pilot control valve 38 to the control oil supply line X and via the pilot control valve 40 to the relief connection Y.

The function of the valve 1' is that of a check valve. By means of the excess length of the surface with which the valve piston 5 limits the actuating pressure space 22 in relation to the end surface of the valve piston 5, which end surface faces the connection A, the pressure of the pressure medium in the connection A causes a resulting force which causes the valve to close if the pressure space 23 has been relieved of load. This is the case in the unactuated state of the pilot control valves 38 and 40. If both pilot control valves 38 and 40 are actuated, the actuating pressure space 23 is separated from the relief connection Y and connected to the control oil supply line X. If a sufficient pressure is provided in the control oil supply line X, the valve piston 5 opens the connection between the consumer connections A and B by means of the hydrostatic force which now acts on the actuating section 21 from the actuating pressure space 23. Safety requirements are met to the effect that the connection between A and B can open only in the event of correctly functioning actuation of both pilot control valves 38 and 40. If, for example, the actuation of the pilot control valve 40 is suppressed, sufficient pressure for opening the valve piston 5 cannot arise in the actuating pressure space 23.

If, in one application, the control oil supply line X is connected to the connection B, then, when the pilot control valves 38 and 40 are actuated, a nonreturn valve function of the valve 1' is also provided. The valve 1' opens for the direction of flow B→A and closes in relation to the direction of flow A→B.

Figure 3:
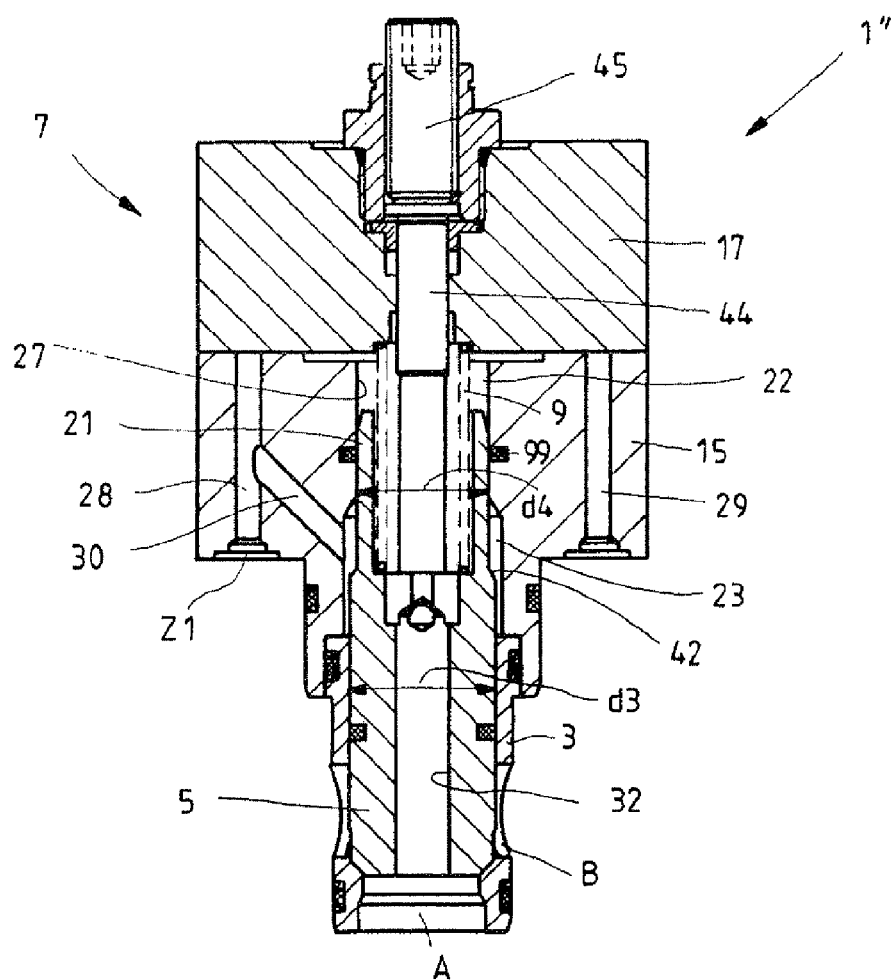
FIG. 3 shows a further variant of the valve which is shown in FIG. 1, and is designed as a rapid check valve and is provided with a lift stop.

As a further variant of the valve 1 and 1', FIG. 3 shows a valve 1" which is configured as a rapid check valve. The valve 1" has a similar construction as the valves 1 or 1'. The differences or modifications are explained below.

The valve piston 5 of the valve 1" has an actuating section 21 which is not—as in the case of the valve 1 or 1'—designed as a radial projection but rather which is set back radially by a step 42 in relation to that section of the valve piston 5 which is guided in the valve bushing 3. The main bore 27 in the intermediate cover 15 is likewise correspondingly narrowed at a shoulder such that the actuating section 21 is guided in the upper, narrowed section of the main bore 27. Two actuating pressure spaces 22 and 23 are again formed.

Pressurization of the actuating pressure space 22, which is bounded by the functional cover 17, results in force being applied to the valve piston 5 in the closing direction. Owing to the radially set-back design of the actuating section 21, pressurization of the annular actuating pressure space 23, which is bounded by the valve piston 5 and by the valve bushing 3, also causes force to be applied to the valve piston in the closing direction. The crucial actuating surface for this purpose corresponds to the difference in the circular surface $(p/4)*d3^2$, with which the valve piston 5 plunges into the valve bushing 3, from the circular surface $(p/4)*d4^2$ with which the actuating section 21 is guided in the narrowed main bore 27.

A lift stop arrangement is provided on the functional cover 17. Said lift stop arrangement comprises a pin 44 which is guided through the functional cover and protrudes into the main bore 27 of the intermediate cover, and an adjustment means 45 by means of which the depth by which the pin 44 protrudes into the main bore 27 can be adjusted. Suitable seals are provided between the pin 44 and the functional cover 17.

As in the case of the check valve 1', a channel 32 which connects the actuating pressure space 22 to the consumer connection A is also guided through the valve piston 5 of the check valve 1". However, the valve piston 5 of the check valve 1" also has an annular surface which can be acted upon from the consumer connection B.

The end surface with which the valve piston 5 blocks off the connection A is slightly larger than the surface with which the actuating section 21 of the valve piston 5 bounds the actuating pressure space 22. In this surface configuration, and when the control pressure space 23 is relieved of load, the valve piston 5 opens the connection A-B as soon as the pressure in A at the surface difference of the end surfaces of the control piston 5 is sufficient to overcome the pretensioning force of the spring 9. Even if the connection B is acted upon with pressure, the valve 1" opens counter to the spring 9. By means of pressurization of the control pressure space 23 via the control connection Z1 and the channel 28, the connection A-B can be blocked. The blocking operation can take place very rapidly, since the forces effective in the opening direction are low, and since the annularly designed control pressure space 23 has only a small volume.

The control pressure space 23 can be activated via the control connection Z1 directly from the control block in which the valve 1" is inserted. As an alternative, a pilot control valve can be arranged on the control cover 17, by means of which pilot control valve the control pressure space 23 can be arbitrarily connected to pilot control pressure or by means of which said control pressure space can be relieved of load. A Z1 connection would then not be bored in the control block 13. Instead of the channel 32, in the case of the valve 1"—and furthermore also in the case of the valve 1'—the connection A can be connected to the control pressure space 22 via channels running through the intermediate cover 15 and the functional cover 17.

If, as an alternative, that end surface of the valve piston 5 which faces the consumer connection A is somewhat smaller than the end surface with which the valve piston 5 bounds the control pressure space 22, the valve 1" has the function of a nonreturn valve. Upon pressurization from the connection A, the valve 1" would block whereas said valve would open upon pressurization from the connection B, provided there is a correspondingly low pressure at the connection A. In this case, pressurization of the control pressure space 23 causes blocking of the connection from B to A.

Furthermore, according to FIGS. 4a and 4b, three-stage variants of an active logic valve 1''' are illustrated. In comparison to the previous variants and embodiments, only slight modifications to the valve piston 5 and the intermediate cover 15 are required in order to obtain the three-stage design.

Starting from the main stage section 50 which is inserted into the valve bushing 3, the valve piston 5 first of all has a radially projecting actuating section 21. The actuating section 21 is adjoined axially by a further actuating section 20 which springs back radially in relation to the actuating section 21. In this case, the diameter d5 at the actuating section 20 is somewhat smaller than the diameter d3 at the main stage section 50. The intermediate cover 15 is designed to be somewhat longer in the axial direction with respect to the main bore 27 than in the case of the valves 1, 1' and 1" which are of two-stage construction. The main bore 27 has a shoulder 52. Said main bore is subdivided by means of the shoulder 52 into a first bore section facing the valve bushing 3 and a second bore section which faces the functional cover 17 and is narrowed in relation to the first bore section. The diameters of the first bore section and of the second bore section are selected in such a manner that the actuating section 21 is guided in the first bore section, and the actuating section 20 is guided in the second bore section. The fits are designed fairly generously. Sealing rings 99 are used for the sealed subdivision into pressure spaces.

The actuating pressure space 23 between the valve bushing 3 and the actuating section 21, the actuating pressure space 24 between the actuating section 21 and the step 52, and the actuating pressure space 22 between the actuating section 20 and the functional cover 17 are delimited by means of the described valve piston 5 and the intermediate cover 15 of the valve 1'''.

By activation of the actuating pressure spaces 23 and 24, the valve piston 5 can be moved in the opening direction or in the closing direction. The actuating pressure spaces 23 and 24 can be actuated, for example, via a directional control valve arranged on the functional cover 17. The opening cross section, which is opened up by the valve piston 5, of the connection A-B can therefore be adjusted proportionally. The actuating pressure space 22 can be used for an additional blocking function or for pressure compensation of the valve piston 5 with regard to the end surface facing the connection A.

The valve 1''' illustrated in FIG. 4b is supplemented by a displacement sensor 49 in comparison to the valve illustrated in FIG. 4a. The displacement sensor 49 is coupled via a pin 47 to the valve piston 5 and can thus measure the position thereof. The spring 9 bears against a plate-like widening of the pin 47 and keeps said pin in contact with the valve piston 5. The valve illustrated in FIG. 4b in conjunction with control electronics, the displacement sensor 49 and a 4/2-port directional pilot control valve, which is activated by the control electronics, the function of a 2/2-port directional control valve in which an opening cross section predetermined arbitrarily—within the structural specifications—can be reliably and rapidly set. Said 4/2-port directional pilot control valve could be mounted laterally on the functional cover 17 or optionally even laterally on the intermediate cover 15 because of the space required by the displacement sensor 49.

According to the disclosure, irrespective of the valve variant described previously, a multiplicity of different active logic valves can be put together according to the disclosure using a clear small number of different valve pistons 5 and intermediate covers 15, depending on the nominal size. The greatest variability is provided by the functional cover 17 for which basically all of the pressure and directional control valve functions mentioned in data sheets RD 21010 and RD 21050 (type LFA of control cover) can be made available. The valve bushing 3 can be limited to a few variants, if any at all. For example, a differentiation may be made between a seat valve variant and a seat slide valve variant. Reference is made in this connection to the types of bushing and types of piston in RD 21010 and RD 21050 (type LC of cartridge valve). The design of the main stage section 50 of the piston 5 can follow the types of piston described in data sheets RD 21010 and RD 21050.

Furthermore, not all of the four described secondary bores 28, 28', 29 and 29' need be formed in the intermediate cover 15. The absence of a secondary bore enables control connections X, Y, Z1 or Z2 formed on the control block side to be closed. Similarly, connections which are optionally present in the functional cover 17 and face the intermediate cover 15 can be closed by the absence of secondary bores in the intermediate cover 15.

The assembly of the valves 1', 1" and 1''' proves just as simple as described with regard to the valve 1. The valve bushing 3, valve piston 5 and intermediate cover can be provided as a preassembled constructional unit. After said preassembled constructional unit is inserted into a control block 13, the functional cover 17, which is optionally already fitted with pilot control valves etc., is screwed on.

The preceding description and the figure serve merely for better understanding of the present disclosure and do not, for instance, limit the disclosure to the exemplary embodiments or to the described variants. The figures are to some extent kept roughly schematic in order to clarify the modes of functioning, operating principles, technical refinements and features. In principle, each mode of functioning, each principle, each technical refinement and each feature shown in the figures or in the text can be freely and optionally combined with all of the claims, each feature in the text and in the other figures, other modes of functioning, principles, technical refinements and features which are contained in or follow from this disclosure, such that all conceivable combinations are to be included within the scope of disclosure of the disclosure. Also included in this case are combinations between all individual statements in the text, i.e. in each portion of the text of the description, in the claims, and also combinations between different exemplary embodiments in the text, in the claims and in the figures.

In addition, the claims do not restrict, or limit, the disclosure and thereby the possibilities for combination of all indicated features with one another. This disclosure also explicitly includes all indicated features, individually and in combination with all other features set forth herein.

According to the disclosure, the valve cover in an active logic valve is divided axially into two components—an intermediate cover and a functional cover with a control channel.

REFERENCE NUMBERS

A Consumer connection
B Consumer connection
X, Y Control connections
Z1, Z2 Control connections
1 Valve
1' Valve
1" Valve
1''' Valve
3 Valve bushing
5 Valve piston
7 Valve cover
9 Spring
11 Valve bore
13 Control block
15 Intermediate cover
17 Functional cover
19 Annular collar
20 Actuating section
21 Actuating section
22 Actuating pressure space
23 Actuating pressure space
24 Actuating pressure space
25 Connecting channel
25' Connecting channel
26 Connecting channel
27 Main bore
28 Secondary bore
28' Secondary bore
29 Secondary bore
29' Secondary bore
30 Bore
32 Channel
34 Installation bore
36 Installation bore
37, 37' Bore
38 2/2-port directional seat valve
39 Bore
40 2/2-port directional switching valve
42 Step
44 Pin
45 Adjustment means
47 Pin
49 Displacement sensor
50 Main stage section
52 Shoulder
98 Sealing ring
99 Sealing ring

The invention claimed is:
1. A valve for installing in a valve bore of a housing or of a valve block, the valve comprising:
a valve bushing configured to be inserted into the valve bore;

a valve piston guided in an axially movable manner in the valve bushing, the valve piston configured to project axially above the valve bushing by means of an actuating section; and a valve cover arranged over the valve bore, the valve cover together with the actuating section of the valve piston forming at least one actuating pressure space, the valve cover divided axially into at least two components, an intermediate cover configured to guide the actuating section in a main bore and a functional cover provided on the intermediate cover on the side remote from the valve bushing, said functional cover having at least one control channel, wherein:

control connections and/or fastening means are arranged with respect to the main bore of the intermediate cover such that changing an alignment of the intermediate cover in predetermined angular steps about a longitudinal axis of the valve bore connects a control channel of the intermediate cover to different control connections of the housing or valve block.

2. The valve as claimed in claim 1, wherein:
the actuating section divides the main bore into an actuating pressure space on the functional cover side and into an actuating pressure space on the valve bushing side,
the intermediate cover has a further control channel for the actuating pressure space on the valve bushing side, and
only the at least one control channel of the functional cover opens into the actuating pressure space on the functional cover side and only the further control channel of the intermediate cover opens into the actuating pressure space on the valve bushing side.

3. The valve as claimed in claim 1, wherein a bottom surface of the main bore of the intermediate cover is formed on the functional cover.

4. The valve as claimed in claim 1, further comprising a spring arranged in the main bore between the functional cover and the valve piston.

5. The valve as claimed in claim 1, wherein the functional cover has means for producing a hydraulic function that includes one of a pilot control valve, a throttle, a connecting surface for a pilot control valve, a lift stop, a displacement sensor, and a switching position monitor.

6. The valve as claimed in claim 1, wherein the intermediate cover has means for producing a hydraulic function that includes one of an actuation lock, a lift stop, a displacement sensor, a switching position monitor, a throttle, a pilot control valve, and a connecting surface for a pilot control valve.

7. The valve as claimed in claim 1, wherein the valve piston is formed integrally with the actuating section.

8. The valve as claimed in claim 1, wherein the actuating section is formed on an actuating piston which is coupled to the valve piston in a manner free from play axially.

9. The valve as claimed in claim 1, wherein the valve is configured as a seat valve, or as a seat slide valve.

10. The valve as claimed in claim 1, wherein on the end side of the intermediate cover which faces the functional cover there is a standardized connection diagram, at least with regard to control connections.

11. The valve as claimed in claim 1, wherein the valve bushing is structured so as to be insertable without a projecting length into a standardized valve bore.

12. The valve as claimed in claim 11, wherein the intermediate cover has a radially extending contact surface for the valve bushing, and/or the intermediate cover has an overhang, which is insertable into the valve bore, for receiving the valve bushing.

13. The valve as claimed in claim 1, further comprising a seal provided between the valve bushing and the valve piston.

14. The valve as claimed in claim 1, wherein a seal is provided between the actuating section and the main bore of the intermediate cover.

15. The valve as claimed in claim 14, wherein the main bore of the intermediate cover includes a recess configured to receive the seal such that the seal is provided between the actuating section and the main bore.

16. The valve as claimed in claim 1, wherein between the valve bushing and the valve piston there is a clearance fit, which can be produced without fine machining of the valve piston.

17. The valve as claimed in claim 1, wherein between the actuating section and the main bore there is a clearance fit, which can be produced without fine machining of the actuating section.

18. The valve as claimed in claim 1, wherein the main bore has a smaller cross section at a mouth on the functional cover side than at a mouth on the side remote from the functional cover.

19. The valve as claimed in claim 1, wherein:
the valve bushing and the intermediate cover are configured as a preassembled constructional unit,
the valve piston is inserted into the valve bushing, and
the valve piston is inserted into the main bore of the intermediate cover via the actuating section.

20. The valve as claimed in claim 19, wherein the preassembled constructional unit comprises sealing rings positioned between the valve bushing and the valve piston, and between the actuating section and the main bore of the intermediate cover.

21. The valve as claimed in claim 1, wherein:
the functional cover is affixed to the intermediate cover such that the functional cover does not contact the valve block, and
the functional cover extends to cover an entire bottom surface of the intermediate cover.

* * * * *